United States Patent
Zeng et al.

(10) Patent No.: US 10,175,527 B2
(45) Date of Patent: Jan. 8, 2019

(54) DISPLAY PANEL AND LIQUID CRYSTAL DISPLAY

(71) Applicant: Wuhan China Star Optoelectronics Technology Co., Ltd., Wuhan, Hubei (CN)

(72) Inventors: Jie Zeng, Guangdong (CN); Anshi Li, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/810,320

(22) Filed: Nov. 13, 2017

(65) Prior Publication Data

US 2018/0067359 A1 Mar. 8, 2018

Related U.S. Application Data

(62) Division of application No. 14/760,707, filed on Jul. 14, 2015, now Pat. No. 9,846,329.

(51) Int. Cl.
*G02F 1/1335* (2006.01)

(52) U.S. Cl.
CPC .. *G02F 1/133528* (2013.01); *G02F 1/133617* (2013.01); *G02F 2001/133614* (2013.01); *G02F 2201/50* (2013.01); *G02F 2202/36* (2013.01)

(58) Field of Classification Search
CPC ... G02F 1/133528; G02F 2001/133614; G02F 2201/50; G02F 2202/36
See application file for complete search history.

(56) References Cited

U.S. PATENT DOCUMENTS

| | | | |
|---|---|---|---|
| 2004/0046909 A1* | 3/2004 | Sekiguchi | G02F 1/1345 349/113 |
| 2014/0043566 A1* | 2/2014 | Lee | G02F 1/133617 349/71 |
| 2016/0161657 A1* | 6/2016 | Yamada | G02B 6/005 349/62 |

* cited by examiner

*Primary Examiner* — Nathanael R Briggs
(74) *Attorney, Agent, or Firm* — Andrew C. Cheng

(57) ABSTRACT

A display panel and a liquid crystal display are disclosed. The display panel includes an upper polarizer, a lower polarizer, a first substrate and a second substrate disposed oppositely between the upper polarizer and the lower substrate, a liquid crystal layer disposed between the first substrate and the second substrate, a quantum dot layer disposed at a side of the second substrate which is far away from the liquid crystal layer, and a protection layer for protecting the quantum dot layer, disposed between the quantum dot layer and the lower polarizer. The quantum dot layer is disposed at a side of the second substrate far away from the liquid crystal layer, and the protection layer is disposed between the quantum dot layer and the lower polarizer. The protection layer is used for preventing the quantum dot layer from being oxidized. The color gamut of LCD can be increased.

11 Claims, 1 Drawing Sheet

DISPLAY PANEL AND LIQUID CRYSTAL DISPLAY

CROSS REFERENCE TO RELATED APPLICATIONS

This is a divisional application of co-pending patent application Ser. No. 14/760,707, filed on Jul. 14, 2015, which is a national stage of PCT Application Number PCT/CN2015/081305, filed on Jun. 12, 2015, claiming foreign priority of Chinese Patent Application Number 201510294248.8, filed on Jun. 1, 2015.

BACKGROUND OF THE INVENTION

1. Field of the Invention

The present invention relates to a display technology, and more particularly to a display panel and a liquid crystal display.

2. Description of Related Art

A liquid crystal display (LCD) generally includes a backlight module and a display panel. The backlight module can provides a sufficient and even distributed backlight source such that the display panel can normally display an image. The LCD usually utilizes Light-Emitting Diode (LED) as a backlight source of the backlight module.

Because the display panel of an LCD displays an image after filtering out lights emitted from the backlight source, the color gamut of the LCD is entirely based on a spectrum of the backlight source. However, the spectrum of an LED backlight source is narrower such that an LCD using an LED as a backlight source has a narrower color gamut so that a color distortion of a displayed image is generated.

SUMMARY OF THE INVENTION

The main technology problem solved by the present invention is to provide a display panel and a liquid crystal display in order to increase a color gamut value of an LCD.

In order to solve the above problems, a technology solution adopted by the present invention is: a display panel, comprising: an upper polarizer; a lower polarizer; a first substrate and a second substrate disposed oppositely between the upper polarizer and the lower polarizer; a liquid crystal layer disposed between the first substrate and the second substrate; a quantum dot layer, disposed at a side of the second substrate which is far away from the liquid crystal layer; and a protection layer for protecting the quantum dot layer, disposed between the quantum dot layer and the lower polarizer; wherein, the quantum dot layer at least covers a projection area on the second substrate projected by the first substrate; the quantum dot layer is formed by quantum dots having three types of diameters by a preset mixing ratio; the three types of diameters respectively correspond to three primary colors of light; the preset mixing ratio is determined by peak values of a spectrum of the three primary colors of light in a light source of a display panel; and wherein, the protection layer for protecting the quantum dot layer is used for preventing the quantum dot layer from being oxidized.

In the display panel, the quantum dot layer is completely covered on a side of the second substrate far away from the liquid crystal layer, and the protection layer is covered on the quantum dot layer.

In the display panel, the protection layer is also covered on two opposite and parallel side surfaces of the second substrate.

In the display panel, an area covered by the quantum dot layer is less than an area of a side of the second substrate far away from the liquid crystal layer, and is greater than or equal to an area of a projection region on the second substrate projected by the upper polarizer or the lower polarizer, and an area covered by the protection layer is equal to the area of the side of the second substrate far away from the liquid crystal layer.

In the display panel, the quantum dot layer is covered on a side of the second substrate far away from the liquid crystal layer through a coating method.

In the display panel, the protection layer is made of polyethylene terephthalate (PET).

In the display panel, the protection layer for protecting the quantum dot layer is a water-air-isolated protection layer, and is fixed by a water-air-isolated double-sided tape.

In order to solve the above problems, another technology solution adopted by the present invention is: a display panel, comprising: an upper polarizer; a lower polarizer; a first substrate and a second substrate disposed oppositely between the upper polarizer and the lower polarizer; a liquid crystal layer disposed between the first substrate and the second substrate; a quantum dot layer, disposed at a side of the second substrate which is far away from the liquid crystal layer; and a protection layer for protecting the quantum dot layer, disposed between the quantum dot layer and the lower polarizer; wherein, the quantum dot layer is disposed at a side of the second substrate far away from the liquid crystal layer, and the protection layer for protecting the quantum dot layer is disposed between the quantum dot layer and the lower polarizer; and wherein, the protection layer for protecting the quantum dot layer is used for preventing the quantum dot layer from being oxidized.

In the display panel, the quantum dot layer at least covers a projection region on the second substrate projected by the first substrate.

In order to solve the above problems, another technology solution adopted by the present invention is: a liquid crystal display, comprising: a display panel, including: an upper polarizer; a lower polarizer; a first substrate and a second substrate disposed oppositely between the upper polarizer and the lower polarizer; a liquid crystal layer disposed between the first substrate and the second substrate; a quantum dot layer, disposed at a side of the second substrate which is far away from the liquid crystal layer; and a protection layer for protecting the quantum dot layer, disposed between the quantum dot layer and the lower polarizer; wherein, the quantum dot layer is disposed at a side of the second substrate far away from the liquid crystal layer, and the protection layer for protecting the quantum dot layer is disposed between the quantum dot layer and the lower polarizer; and wherein, the protection layer for protecting the quantum dot layer is used for preventing the quantum dot layer from being oxidized.

The beneficial effect of the present application is: comparing with the conventional art, through disposing a quantum dot layer at a side of the second substrate far away from the liquid crystal layer, and a protection layer for protecting the quantum dot layer is disposed at a side of the quantum dot layer far away from the second substrate. Accordingly, the display color gamut value can be increased in order to improve the display effect.

DETAILED DESCRIPTION OF THE PREFERRED EMBODIMENT

The following content combines figures and embodiments for detail description of the present invention.

Figure 1:
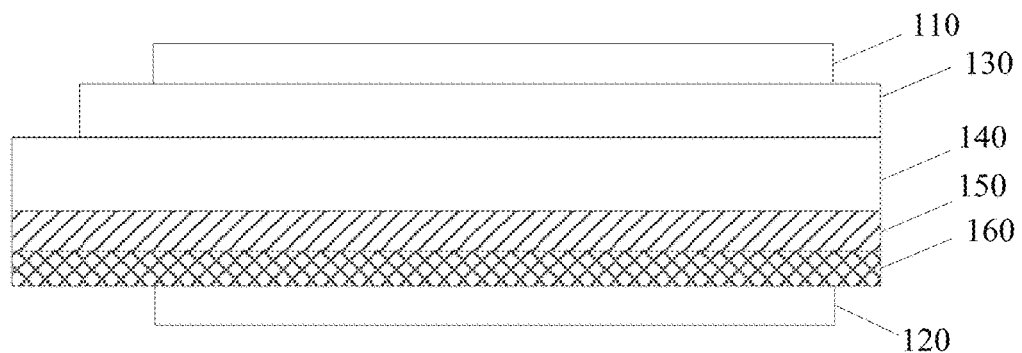
FIG. 1 is a schematic diagram of a display panel according to an embodiment of the present invention.

With reference to FIG. 1, FIG. 1 is a schematic diagram of a display panel according to an embodiment of the present invention. The display panel of the present invention is applied to a liquid crystal display (LCD).

The display panel includes an upper polarizer 110, a lower polarizer 120, a first substrate 130 and a second substrate 140 disposed oppositely between the upper polarizer 110 and the lower polarizer 120. A liquid crystal layer (not shown in the figure) disposed between the first substrate 130 and the second substrate 140. The display panel also includes a quantum dot layer 150 and a protection layer 160 for protecting the quantum dot layer 150.

The first substrate 130 is a color filter (CF) substrate, and the second substrate 140 is an array substrate. The quantum dot layer 150 is disposed at a side of the second substrate 140 which is far away from the liquid crystal layer. The protection layer 160 for protecting the quantum dot layer 150 is disposed between the quantum dot layer 150 and the lower polarizer 120.

The upper polarizer 110 and the lower polarizer 120 are disposed oppositely, and are the same in size and shape. A projection region on the second substrate 140 projected by the upper polarizer 110 and a projection region on the second substrate 140 projected by the lower polarizer 120 are the same. An area of the quantum dot layer 150 which covers the second substrate 140 is not less than (greater than or equal to) a projection region on the second substrate 140 projected by the upper polarizer 110 or a projection region on the second substrate 140 projected by the lower polarizer 120.

When a projection region on the second substrate 140 projected by the upper polarizer 110 and a projection area on the second substrate 140 projected by the lower polarizer 120 are different, the area of the quantum dot layer 150 which covers the second substrate 140 is not less than (greater than or equal to) a larger projection region on the second substrate 140 projected by the upper polarizer 110 or the lower polarizer 120.

The quantum dot layer 150 is used for emitting three primary colors of light and filtering out the other colors of light (not include the three primary colors of light) in order to compensate a color gamut of three primary colors of light in a light source. The three primary colors of light include a red light, a green light and a blue light.

The protection layer 160 for protecting the quantum dot layer 150 is used for preventing the quantum dot layer 150 from being oxidized by water or air.

Through above embodiments, a quantum dot layer is disposed at a side of the second substrate far away from the liquid crystal layer, and a protection layer for protecting the quantum dot layer is disposed at a side of the quantum dot layer far away from the second substrate. Accordingly, the display color gamut value can be increased in order to improve the display effect.

Figure 2:
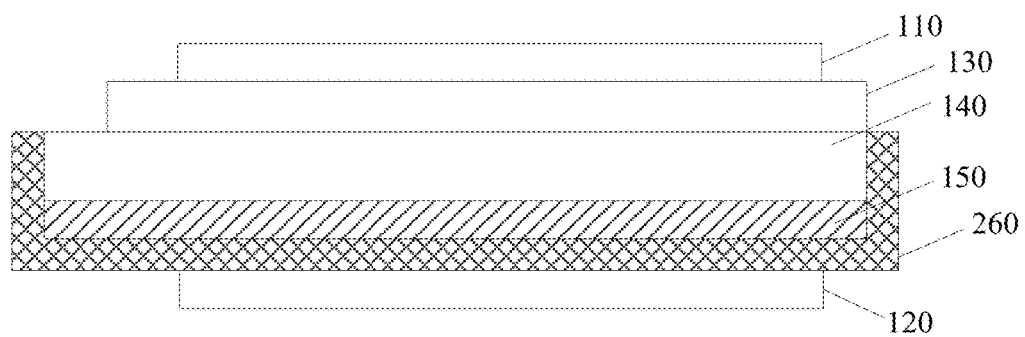
FIG. 2 is a schematic diagram of a display panel according to another embodiment of the present invention.

With reference to FIG. 2, FIG. 2 is a schematic diagram of a display panel according to another embodiment of the present invention.

The display panel includes an upper polarizer 110, a lower polarizer 120, a first substrate 130 and a second substrate 140 disposed oppositely between the upper polarizer 110 and the lower polarizer 120, and a liquid crystal layer (not shown in the figure) disposed between the first substrate 130 and the second substrate 140. The display panel also includes a quantum dot layer 150 and a protection layer 260 for protecting the quantum dot layer 150.

The first substrate 130 is a color filter (CF) substrate, and the second substrate 140 is an array substrate. The quantum dot layer 150 is disposed at a side of the second substrate 140, which is far away from the liquid crystal layer. The protection layer 260 for protecting the quantum dot layer 150 is disposed between the quantum dot layer and the lower polarizer 120.

The protection layer 260 for protecting the quantum dot layer 150 is used for preventing the quantum dot layer 150 from being oxidized by water or air.

The quantum dot layer 150 is covered on a side of the second substrate 140 far away from the liquid crystal layer through a coating method. The protection layer 260 for protecting the quantum dot layer 150 is a water-air-isolated protection layer. The protection layer 260 for protecting the quantum dot layer 150 is fixed by a water-air-isolated double-sided tape. In another embodiment, the protection layer 260 can be fixed by other methods. The protection layer 260 can be made by polyethylene terephthalate (PET). In another embodiment, the protection layer 260 can also be made by another material having a water-air-isolated function.

Because the first substrate 130 is not less than the upper polarizer 110 and the lower polarizer 120, the quantum dot layer 150 can completely cover the side of the second substrate 140 far away from the liquid crystal layer. The protection layer 260 for protecting the quantum dot layer 150 covers a side of the quantum dot layer 150 far away from the second substrate 140. Besides, the protection layer 260 for protecting the quantum dot layer 150 also covers two side surfaces of the quantum dot layer 150 and two opposite and parallel side surfaces (i.e., side surfaces perpendicular to the liquid crystal layer) of the second substrate 140 in order to prevent the side surfaces of the quantum dot layer 150 from being oxidized by water or air.

In another embodiment, the quantum dot layer 150 and the protection layer 260 can also be disposed in another arrangement. For example, the quantum dot layer 150 can completely covers a side of the second substrate 140 far away from the liquid crystal layer. The protection layer 260 can cover a side of the quantum dot layer 150 far away from the second substrate 140 and two side surfaces of the quantum dot layer 150 such that the protection layer 260 completely covers the quantum dot layer 150.

The quantum dot layer 150 is used for emitting three primary colors of light and filtering out the other colors of light (not include the three primary colors of light) in order to compensate a color gamut of three primary colors of light in a light source. Wherein, the three primary colors of light include a red light, a green light and a blue light.

A quantum dot is a nanocrystal having a diameter less than a bulk exciton Bohr radius. A quantum dot (QD, also known as semiconductor nanocrystal) can emit a visible light or an infrared light under an irradiation of a light source. Because of the quantum confinement effect, an energy difference between electron states of a quantum dot is a function of physical dimension and composition of the quantum dot. Accordingly, optical and optoelectronic properties of a quantum dot can be regulated by changing the physical dimension of the quantum dot.

A quantum dot can absorb lights having wavelengths that are shorter than a peak wavelength, and can emit a light having a wavelength longer than the peak wavelength. For example, a quantum dot having 2 nm in the diameter can emit a blue light under the irradiation of a light source. A quantum dot having 10 nm in the diameter can emit a red light under the irradiation of a light source.

The ability of the quantum dot layer 150 for compensating a display color gamut value is related to diameters of quantum dots in the quantum dot layer 150 and a mixing ratio of different diameters of quantum dots.

The quantum dot layer 150 is formed by quantum dots having at least three types of diameters by a preset mixing ratio. The three types of diameters respectively correspond to the three primary colors of light. The preset ratio is determined by peak values of a spectrum of the three primary colors of light in the light source of the display panel. That is, the types of diameters of the quantum dots in the quantum dot layer 150 at least include diameters that can emit and correspond to the three primary colors of light. The preset ratio of different types of diameters of the quantum dots is determined by the peak values of the spectrum of the three primary colors of light in the light source.

When a peak value of a spectrum of one of three primary colors of light in a light source is lower, an occupied ratio of quantum dots having a type of diameter corresponding to the one of three primary colors of light can be increased. Of course, in another embodiment, peak values of a spectrum of three primary colors of light in a light source can be compared with peak values of a spectrum of three primary colors of light corresponding to expected color gamut values. Respectively calculating a difference value between peak values of a spectrum of three primary colors of light in a light source and peak values of a spectrum of three primary colors of light corresponding to expected color gamut values, and a mixing ratio can be determined according to the difference values.

Because the light source is different, peak values of a spectrum of three primary colors in a light source are also different. Mixing ratios of quantum dots having different types of diameters are also different. A mixing ratio of quantum dots having different types of diameters can be disposed in order to regulate a color gamut value and obtain a better display effect according to an actual situation.

Through above embodiments, a quantum dot layer is disposed at a side of the second substrate far away from the liquid crystal layer, and a protection layer for protecting the quantum dot layer is disposed at a side of the quantum dot layer far away from the second substrate. Accordingly, the display color gamut value can be increased in order to improve the display effect.

The protection layer of the quantum dot layer can completely cover the quantum dot layer in order to prevent edges of the quantum dot layer from being oxidized so that a decreased color gamut value and a worse display effect because of the quantum dot layer being oxidized are prevented.

Figure 3:
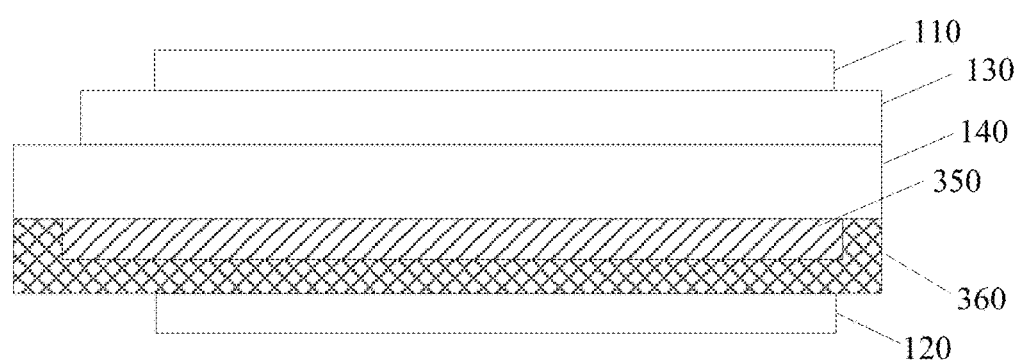
FIG. 3 is a schematic diagram of a display panel according to another embodiment of the present invention.

With reference to FIG. 3, FIG. 3 is a schematic diagram of a display panel according to another embodiment of the present invention. The difference between the present embodiment and the embodiment corresponding to FIG. 2 is an arrangement of a quantum dot layer 350 and a protection layer 360.

Specifically, an area covered by the quantum dot layer 350 is less than an area of a side of the second substrate 140 far away from the liquid crystal layer, and is greater than or equal to an area of a projection region on the second substrate 140 projected by an upper polarizer 110 or a lower polarizer 120. An area covered by the protection layer 360 is equal to an area of a side of the second substrate 140 far away from the liquid crystal layer.

Because a thickness of the second substrate 140 is limited, the reliability of bonding the protection layer 360 on two side surfaces of the second substrate 140 which are perpendicular to the liquid crystal layer is not good. Therefore, the quantum dot layer 150 does not completely cover the second substrate 140 in order to reserve a space for bonding the protection layer 360 so as to protect the quantum dot layer 150 better and keep a display effect having a higher color gamut.

In the present embodiment, the quantum dot layer 150 covers a portion of a side of the second substrate 140 far away from the liquid crystal layer. Besides, an area covered by the quantum dot layer 350 is less than an area of a side of the second substrate 140 far away from the liquid crystal layer, and is greater than or equal to an area of a projection region on the second substrate 140 projected by an upper polarizer 110 or a lower polarizer 120. When a projection region on the second substrate 140 projected by an upper polarizer 110 and a projection region on the second substrate 140 projected by a lower polarizer 120 are different. An area covered by the quantum dot layer 350 is greater than or equal to an area of a larger projection region on the second substrate 140 projected by the upper polarizer 110 or the lower polarizer 120.

The protection layer 360 for protecting the quantum dot layer 350 completely covers the quantum dot layer 350. An area covered by the protection layer 360 is equal to a side of the second substrate 140 far away from the liquid crystal layer.

Through above embodiments, a quantum dot layer is disposed at a side of the second substrate far away from the liquid crystal layer, and a protection layer for protecting the quantum dot layer is disposed at a side of the quantum dot layer far away from the second substrate. Accordingly, the display color gamut value can be increased in order to improve the display effect. Because the protection layer for protecting the quantum dot layer can completely cover the quantum dot layer in order to prevent edges of the quantum dot layer from being oxidized so that a decreased color gamut value and a worse display effect because of the quantum dot layer being oxidized are prevented.

The present invention also provides a liquid crystal display. The liquid crystal display includes a display panel described at anyone of the above embodiments.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel, comprising:
   an upper polarizer;
   a lower polarizer;
   a first substrate and a second substrate disposed oppositely between the upper polarizer and the lower polarizer;
   a liquid crystal layer disposed between the first substrate and the second substrate;

a quantum dot layer, disposed at a side of the second substrate which is far away from the liquid crystal layer; and a protection layer for protecting the quantum dot layer, disposed between the quantum dot layer and the lower polarizer;

wherein the quantum dot layer at least covers a projection area on the second substrate projected by the first substrate; the quantum dot layer is formed by quantum dots having three types of diameters by a preset mixing ratio; the three types of diameters respectively correspond to three primary colors of light; the preset mixing ratio is determined by peak values of a spectrum of the three primary colors of light in a light source of a display panel;

wherein the quantum dot layer is set on and completely covers the side of the second substrate far away from the liquid crystal layer, and the protection layer is set on and covers the quantum dot layer; and wherein the protection layer for protecting the quantum dot layer is used for preventing the quantum dot layer from being oxidized;

wherein the protection layer is directly set on the quantum dot layer so that the protection layer and the quantum dot layer collectively form a stacked combination, the stacked combination being interposed between the lower polarizer and the second substrate; and wherein the quantum dot layer covers a portion of a surface area of the one side of the second substrate that is greater than a projection area of the each of the upper and lower polarizers on the one side of the second substrate.

2. The display panel according to claim 1, wherein the protection layer also covers two opposite and parallel side surfaces of the second substrate.

3. The display panel according to claim 1, wherein the quantum dot layer is covered on a side of the second substrate far away from the liquid crystal layer through a coating method.

4. The display panel according to claim 1, wherein the protection layer is made of polyethylene terephthalate (PET).

5. The display panel according to claim 1, wherein the protection layer for protecting the quantum dot layer is a water-air-isolated protection layer, and is fixed by a water-air-isolated double-sided tape.

6. A display panel, comprising:
an upper polarizer;
a lower polarizer;
a first substrate and a second substrate disposed oppositely between the upper polarizer and the lower polarizer;

a liquid crystal layer disposed between the first substrate and the second substrate;

a quantum dot layer, disposed at a side of the second substrate which is far away from the liquid crystal layer; and a protection layer for protecting the quantum dot layer, disposed between the quantum dot layer and the lower polarizer;

wherein the quantum dot layer at least covers a projection region on the second substrate projected by the first substrate;

wherein the quantum dot layer is set on and completely covers the side of the second substrate far away from the liquid crystal layer, and the protection layer is set on and covers the quantum dot layer; and wherein the protection layer for protecting the quantum dot layer is used for preventing the quantum dot layer from being oxidized;

wherein the protection layer is directly set on the quantum dot layer so that the protection layer and the quantum dot layer collectively form a stacked combination, the stacked combination being interposed between the lower polarizer and the second substrate; and wherein the quantum dot layer covers a portion of a surface area of the one side of the second substrate that is greater than a projection area of the each of the upper and lower polarizers on the one side of the second substrate.

7. The display panel according to claim 6, wherein the protection layer also covers two opposite and parallel side surfaces of the second substrate.

8. The display panel according to claim 6, wherein the quantum dot layer is covered on the side of the second substrate far away from the liquid crystal layer through a coating method.

9. The display panel according to claim 6, wherein the quantum dot layer is formed by quantum dots having three types of diameters by a preset mixing ratio; the three types of diameters respectively correspond to three primary colors of light; the preset mixing ratio is determined by peak values of a spectrum of the three primary colors of light in a light source of a display panel.

10. The display panel according to claim 6, wherein, the protection layer is made of polyethylene terephthalate (PET).

11. The display panel according to claim 6, wherein the protection layer for protecting the quantum dot layer is a water-air-isolated protection layer, and is fixed by a water-air-isolated double-sided tape.

* * * * *